(12) United States Patent
Hirayama et al.

(10) Patent No.: US 8,741,399 B2
(45) Date of Patent: Jun. 3, 2014

(54) BIREFRINGENT FILM, POLARIZING PLATE, IMAGE DISPLAY, AND AROMATIC POLYESTER

(75) Inventors: Tomoyuki Hirayama, Ibaraki (JP); Toshiyuki Iida, Ibaraki (JP); Yutaka Ohmori, Ibaraki (JP); Satoru Suzuki, Ibaraki (JP); Miyuki Kurogi, Ibaraki (JP); Hisae Shimizu, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 687 days.

(21) Appl. No.: 12/920,528

(22) PCT Filed: Mar. 25, 2009

(86) PCT No.: PCT/JP2009/055881
§ 371 (c)(1),
(2), (4) Date: Sep. 1, 2010

(87) PCT Pub. No.: WO2009/128325
PCT Pub. Date: Oct. 22, 2009

(65) Prior Publication Data
US 2011/0013278 A1    Jan. 20, 2011

(30) Foreign Application Priority Data

Apr. 16, 2008 (JP) .................................. 2008-106659

(51) Int. Cl.
*C09K 19/00* (2006.01)

(52) U.S. Cl.
USPC ...... 428/1.33; 428/1.3; 359/489.11; 528/190; 528/176; 528/271; 528/272

(58) Field of Classification Search
USPC .................. 428/1.3, 1.31, 1.33; 359/489.11; 528/271, 272, 176, 190, 194
See application file for complete search history.

(56) References Cited

U.S. PATENT DOCUMENTS 4,731,432 A * 3/1988 Portugall ............... 528/190
2002/0055607 A1 5/2002 Okamoto et al.

FOREIGN PATENT DOCUMENTS

| JP | 2-091119 A | 3/1990 |
|---|---|---|
| JP | 02-150421 A | 6/1990 |

(Continued)

OTHER PUBLICATIONS

Machine Englsih translation of JP 08-134336, Aug. 2012.*

(Continued)

*Primary Examiner* — Gwendolyn Blackwell
*Assistant Examiner* — Ruiyun Zhang
(74) *Attorney, Agent, or Firm* — Westerman, Hattori, Daniels & Adrian, LLP

(57) ABSTRACT

The birefringent film of the present invention contains an aromatic polyester having a repeating unit represented by the following general formula (1).
In the general formula (1), A(s), B(s), C(s), and D(s) are each independently represent a group selected from a halogeno group, an alkyl group which has 1 to 6 carbon atoms, and an aryl group. Also, a and b each represent an integer of 0 to 4, and c and d each represent an integer of 0 to 3. R1 represents a hydrogen atom, or an alkyl group which has 1 to 10 carbon atoms. R2 represents an alkyl group which has 2 to 10 carbon atoms. R3 to R6 each independently represent a group or atom selected from a hydrogen atom, a halogeno group, an alkyl group which has 1 to 6 carbon atoms, and an aryl group. Furthermore, l and m each represent an integer of 2 or more.

[chemical formula 1]

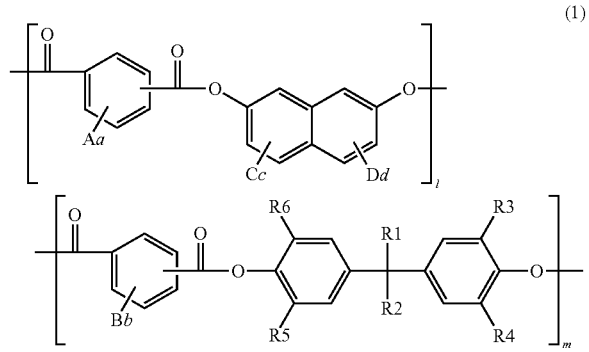

8 Claims, 1 Drawing Sheet (56) References Cited

FOREIGN PATENT DOCUMENTS

| JP | 2-150421 A | | 6/1990 |
|---|---|---|---|
| JP | 4-256903 A | | 9/1992 |
| JP | 08134336 A | * | 5/1996 |
| JP | 2002-146003 A | | 5/2002 |
| JP | 2004-70329 A | | 3/2004 |

OTHER PUBLICATIONS

Korean Office Action dated Nov. 17, 2011, issued in corresponding Korean Patent Application No. 10-2010-7003659.(with partial English translation).

International Search Report of PCT/JP2009/055881, mailing date of Jun. 16, 2009.

Japanese Office Action dated Apr. 12, 2013, issued in corresponding Japanese Patent Application No. 2008-106659, w/ partial English translation.

English translation of the Abstract of JP 04-256903 A, which was cited in the Notice of Allowance dated Aug. 2, 2013, issued in corresponding Japanese application No. 2008-106659. JP 04-256903 A was previously cited in an IDS on Sep. 1, 2010 and was considered on Jan. 16, 2013.

English translation of Claim 1 of JP 02-091119 A, which was cited in the Notice of Allowance dated Aug. 2, 2013, issued in corresponding Japanese application No. 2008-106659. JP 02-091119 a was previously cited in an IDS on Sep. 1, 2010 and was considered on Jan. 16, 2013.

* cited by examiner

BIREFRINGENT FILM, POLARIZING PLATE, IMAGE DISPLAY, AND AROMATIC POLYESTER

TECHNICAL FIELD

The present invention relates to a birefringent film and a polarizing plate that are each used in a liquid crystal display or the like, and an aromatic polyester useful as a forming material for the birefringent film.

BACKGROUND ART

The liquid crystal display is an image display wherein electrooptical properties of liquid crystal molecules are used to display characters or images. However, the liquid crystal display makes use of liquid crystal molecules having optical anisotropy; thus, good display characteristics are exhibited in a certain direction while its screen becomes dark or unclear in other directions. For this reason, the liquid crystal display is equipped with a birefringent film having a predetermined retardation. For reference, a birefringent film is also called a retardation film, a compensation layer, or some other.

Hitherto, a birefringent film has been known which contains, as a main component thereof, an aromatic polyester (Patent Document 1).

The aromatic polyester described in Patent Document 1 has a repeating unit in which terephthalate or isophthalate is ester-linked to bisphenol groups.

This aromatic polyester-containing birefringent film is usually formed by a solution casting method.

The solution casting method is a method of dissolving a polymer in a solvent to prepare a solution, coating this solution onto a metallic drum, a substrate or the like, and then drying the workpiece to form a film.

Patent Document 1: JP-A-2004-70329

DISCLOSURE OF THE INVENTION

Technical Problem

When a birefringent film is formed by the solution casting method, it is preferable to dissolve the polymer in a widely-used organic solvent (for example, toluene). It is particularly preferable to dissolve the polymer in an organic solvent low in polarity.

However, the above-mentioned conventional aromatic polyester is low in solubility in a widely-used organic solvent (for example, an organic solvent low in polarity, such as toluene).

Thus, in the solution casting method using such a conventional aromatic polyester, conditions for drying the coated solution, and others are limited. Accordingly, when a birefringent film is formed, widely-used production facilities cannot be used. Thus, there remains a problem that it is indispensable to use expensive production equipment.

Moreover, it is preferable that birefringent films have a large birefringence index in the thickness direction.

An object of the present invention is to provide a birefringent film which can easily be produced by a solution casting method, and has a relatively large birefringence index in the thickness direction.

Another object of the present invention is to provide a polarizing plate and an image display which each have the birefringent film.

Still another object of the present invention is to provide an aromatic polyester which is good in solubility in various solvents, and can easily be formed into a film by a solution casing method or the like.

Solution to Problem

For the objects, the inventors have made eager researches to find out the following finding.

A birefringent film containing an aromatic polyester having a linear main chain is large in birefringence index in the thickness direction. In the meantime, an aromatic polyester having a linear main chain is low in solubility in a solvent. In other words, an aromatic polyester having a bent main chain is good in solubility in a solvent.

In conclusion, an aromatic polyester capable of forming a birefringent film large in birefringence index in the thickness direction is usually low in solubility in a solvent. Accordingly, there is a tradeoff relationship between obtaining a birefringent film large in birefringence index in the thickness direction and making the solubility in a solvent of an aromatic polyester high.

The inventors have made eager researches to find out an aromatic polyester making it possible to improve the tradeoff relationship.

The birefringent film of the present invention contains the aromatic polyester having the repeating unit represented by the following general formula (1).

[chemical formula 1]

In the above formula (1), A(s), B(s), C(s) and D(s) are each a substituent, and a, b, c, and d are each the substitution number of the corresponding A(s), B(s), C(s), or D(s). A(s), B(s), C(s), and D(s) each independently represent a group selected from a halogeno group, a linear or branched alkyl group which has 1 to 6 carbon atoms and may have a substituent, and an aryl group which may have a substituent. Also, a and b each represent an integer of 0 to 4, and c and d each represent an integer of 0 to 3. R1 represents a hydrogen atom, or a linear or branched alkyl group which has 1 to 10 carbon atoms and may have a substituent. R2 represents a linear or branched alkyl group which has 2 to 10 carbon atoms and may have a substituent. R3 to R6 each independently represent a group or atom selected from a hydrogen atom, a halogeno group, a linear or branched alkyl group which has 1 to 6 carbon atoms and may have a substituent, and an aryl group which may have a substituent. Furthermore, l and m each represent an integer of 2 or more.

The aromatic polyester has a repeating unit having a 2,7-naphthylene group, and a repeating unit having a bisphenol group having a substituent represented by R2.

The 2,7-naphthylene groups in the aromatic polyester exhibit an effect as described in the following.

In another preferable birefringent film of the present invention, R1 in the general formula (1) is a methyl group which may have a substituent, and R2 is a linear or branched alkyl group which has 2 to 4 carbon atoms and may have a substituent.

In another preferable birefringent film of the present invention, R3 to R6 in the general formula (1) are each a linear or branched alkyl group which has 1 to 4 carbon atoms and may have a substituent.

In another preferable birefringent film of the present invention, the aromatic polyester has the repeating unit represented by the following general formula (2).

[chemical formula 2]

In the formula (2), R1 to R6, l, and m have the same meanings as in the formula (1).

In another preferable birefringent film of the present invention, the birefringence index (Δnxz) in the thickness direction thereof is 0.02 or more at a wavelength of 550 nm.

In another aspect of the present invention, a polarizing plate having any one of the birefringent films described above and a polarizer is provided.

In another aspect of the present invention, an image display having any one of the birefringent films described above is provided.

In another aspect of the present invention, an aromatic polyester having a repeating unit represented by the above general formula (1) or the above general formula (2) is provided.

The 2,7-naphthylene groups cause the main chain of the aromatic polyester to be bent to an appropriate degree. For this reason, the aromatic polyester comes to be easily dissolved in various solvents.

The naphthylene groups are rich in π electrons; thus, the groups have an effect of intensifying interaction between aromatic groups in the aromatic polyester. Accordingly, a birefringent film containing the aromatic polyester, which has the naphthylene groups, becomes large in birefringence index in the thickness direction.

The bisphenol group having a substituent represented by R2 exhibits an effect as described in the following.

R2 is a linear or branched alkyl group which has 2 to 10 carbon atoms and may have a substituent. R2 is positioned between the two benzene rings of the bisphenol group. Since R2 becomes a steric hindrance, the two benzene rings of the bisphenol group are twisted. An aromatic polyester wherein two benzene rings are twisted in this manner comes to be easily dissolved in various solvents.

Furthermore, in the bisphenol group, the two benzene rings are bonded to each other at the para-positions thereof. For this reason, the main chain of the aromatic polyester in the bisphenol group keeps linearity. Accordingly, a birefringent film containing the aromatic polyester, which has the bisphenol group, becomes large in birefringence index in the thickness direction.

The aromatic polyester is good in solubility in various solvents including widely-used organic solvents. A birefringent film containing the aromatic polyester can easily be produced without being subjected to restrictions about drying conditions in the solution casting method or others.

The aromatic polyester-containing birefringent film becomes large in birefringence index in the thickness direction. Thus, the birefringent film has a relatively large retardation value in the thickness direction even when the thickness thereof is relatively small.

In the preferable birefringent film of the present invention, R2 in the general formula (1) is an alkyl group which has more carbon atoms than R1 has.

Advantageous Effects Of Invention

The birefringent film of the present invention can easily be produced by, for example, a solution casting method. The birefringent film of the present invention is large in birefringence index in the thickness direction. Thus, the birefringent film of the present invention has a relatively high retardation value in the thickness direction even when the thickness thereof is relatively small.

Furthermore, the aromatic polyester of the present invention is good in solubility in various solvents. Therefore, the use of the aromatic polyester of the present invention makes it possible to produce a film easily by a solution casting method.

BEST MODE FOR CARRYING OUT THE INVENTION

The meaning of terms used in the present invention is as follows.

"Birefringent film" means a film having a birefringence (anisotropy of refractive index) in the plane and/or the thickness thereof.

Also, "nx" represents a refractive index in the direction (X axis direction) in which a refractive index in a plane of a birefringent film becomes the maximum, "ny" represents a refractive index in the direction (Y axis direction) orthogonal to the X axis direction in the same plane, and "nz" represents a refractive index in the direction (the thickness direction) orthogonal to the X axis direction and the Y axis direction. Here, nx≥ny.

Furthermore, "Δnxz" represents a birefringent index in the thickness direction of a film measured at 23° C. at a wavelength of λ(nm). Here, Δnxz may be determined by Δnxz=nx−nz.

"A retardation value in the thickness direction (Rth(λ))" means a retardation value in the thickness direction of a film measured at 23° C. at a wavelength of λ(nm). When taking thickness of a film to be measured as d(nm), Rth(λ) may be determined by Rth(λ)=(nx−nz)×d.

"A in-plane retardation value (Re(λ))" means a retardation value in the plane of a film measured at 23° C. at a wavelength of λ(nm). When taking thickness of a film to be measured as d(nm), Re(λ) may be determined by Re(λ)=(nx−ny)×d.

"Transmittance (T(λ))" means a light transmittance of a film at a wavelength of λ.

"Polymer" includes a high polymer having degree of polymerization (total degree of polymerization of each constituent unit when the polymer includes a plurality of repeating units) of equal to or more than 20, and a low polymer having degree of polymerization of equal to or more than 2 and less than 20 (also referred to as oligomer).

(Aromatic Polyester of the Present Invention)

The aromatic polyester of the present invention has a repeating unit represented by a general formula (1) illustrated below.

The birefringent film of the present invention is a film containing the aromatic polyester. The birefringent film of the present invention is obtained, for example, by coating a solution wherein the aromatic polyester is dissolved in a solvent on an appropriate substrate, and then drying the resultant.

[chemical formula 3]

(1)

In the above formula (1), A(s), B(s), C(s) and D(s) are each a substituent, and a, b, c, and d are each the substitution number of the corresponding A(s), B(s), C(s), or D(s). A(s), B(s), C(s), and D(s) each independently represent a group selected from a halogeno group, a linear or branched alkyl group which has 1 to 6 carbon atoms and may have a substituent, and an aryl group which may have a substituent. Also, a and b each represent an integer of 0 to 4, and c and d each represent an integer of 0 to 3. R1 represents a hydrogen atom, or a linear or branched alkyl group which has 1 to 10 carbon atoms and may have a substituent. R2 represents a linear or branched alkyl group which has 2 to 10 carbon atoms and may have a substituent. R3 to R6 each independently represent a group or atom selected from a hydrogen atom, a halogeno group, a linear or branched alkyl group which has 1 to 6 carbon atoms and may have a substituent, and an aryl group which may have a substituent. Furthermore, l and m each represent an integer of 2 or more.

In the present specification, the expression "which may have a substituent" means "which has a substituent or no substituent (substituted with a substituent or is not substituted with any substituent)".

When A(s), B(s), C(s) or D(s) is/are (each) a linear or branched alkyl group which has 1 to 6 carbon atoms and has a substituent, or an aryl group which has a substituent, examples of the substituent include a halogeno group, an OH group, a COOH group, an $NH_2$ group, an $SO_3H$ group, and the like.

When R1 is a linear or branched alkyl group which has 1 to 10 carbon atoms and has a substituent, examples of the substituent include a halogeno group, an OH group, a COOH group, an $NH_2$ group, an $SO_3H$ group, and the like.

When R2 is a linear or branched alkyl group which has 2 to 10 carbon atoms and has a substituent, examples of the substituent include a halogeno group, an OH group, a COOH group, an $NH_2$ group, an $SO_3H$ group, and the like.

When R3, R4, R5, or R6 is each a linear or branched alkyl group which has 1 to 6 carbon atoms and a substituent, or an aryl group which has a substituent, examples of the substituent include a halogeno group, an OH group, a COOH group, an $NH_2$ group, an $SO_3H$ group, and the like.

In the general formula (1), A(s), B(s), C(s), and D(s) are each independently preferably a group selected from a halogeno group, an unsubstituted alkyl group having 1 to 6 carbon atoms, and an unsubstituted aryl group, more preferably a group selected from a halogeno group, an unsubstituted alkyl group having 1 to 4 carbon atoms, and an unsubstituted phenyl group. The expression "unsubstituted" means "which has no substituent".

In the general formula (1), a, b, c, and d are each preferably represent an integer of 0 to 2 and more preferably an integer of 0 to 1.

In one preferably embodiment of the aromatic polyester of the present invention, a, b, c, and d each are 0 in the general formula (1). This aromatic polyester has the repeating unit represented by the following general formula (2).

[chemical formula 4]

(2)

In another preferable embodiment of the present invention, the aromatic polyester has a repeating unit represented by the following general formula (3) or the following general formula (4).

[chemical formula 5]

(3)

[chemical formula 6]

(4)

In each of the formulae (2) to (4), R1 to R6, l, and m have the same meanings as in the formula (1).

In each of the formulae (1) to (4), R1 is preferably a linear or branched alkyl group which has 1 to 6 carbon atoms and may have a substituent, more preferably an alkyl group which has 1 to 2 carbon atoms and may have a substituent, even more preferably a methyl group which may have a substituent, and particularly preferably an unsubstituted alkyl group having 1 to 2 carbon atoms.

In each of the formulae (1) to (4), R2 is preferably a linear or branched alkyl group which has 2 to 8 carbon atoms and may have a substituent, more preferably a linear or branched alkyl group which has 2 to 6 carbon atoms and may have a substituent, even more preferably a linear or branched alkyl group which has 2 to 4 carbon atoms and may have a substituent, and particularly preferably a linear or branched unsubstituted alkyl group having 2 to 4 carbon atoms. Examples of the alkyl group which has 2 to 4 carbon atoms include an ethyl group, a propyl group, butyl groups such as an isobutyl group, and the like.

In each of the formulae (1) to (4), R2 is preferably an alkyl group which has more carbon atoms than the alkyl group represented by R1 has. In each of the formulae (1) to (4), R2 is, for example, an alkyl group which has at least two more carbon atoms than the alkyl group represented by R1 has, and is preferably an alkyl group which has at least three more carbon atoms than the alkyl group represented by R1 has. R2 is preferably a branched alkyl group.

When R2 is an alkyl group which has more carbon atoms than R1 has, R2 is bulkier than R1. For this reason, R2, which is positioned between the two benzene rings of the bisphenol group, becomes a steric hindrance so that the two benzene rings are easily twisted. When R2 is, in particular, a branched alkyl group, the steric hindrance is favorably increased.

In each of the formulae (1) to (4), R3 to R6 are each independently preferably a group selected from a halogeno group, a linear or branched alkyl group which has 1 to 6 carbon atoms and may have a substituent, and an aryl group which may have a substituent. In each of the formulae (1) to (4), R3 to R6 are each independently more preferably a halogeno group, or a linear or branched alkyl group which has 1 to 6 carbon atoms and may have a substituent, even more preferably a linear or branched alkyl group which has 1 to 4 carbon atoms and may have a substituent, and particularly preferably an alkyl group which has 1 to 2 carbon atoms and may have a substituent. Examples of the alkyl group having 1 to 2 carbon atoms include a methyl group and an ethyl group.

Another preferable embodiment of the aromatic polyester of the present invention contains the repeating unit represented by the following formula (5). In the formula (5), l and m have the same meanings as in the formula (1).

[chemical formula 7]

(5)

It is sufficient for the aromatic polyester of the present invention to have at least one repeating unit selected from repeating units represented by the formulae (1) to (5). In the aromatic polyester of the present invention, for example, a repeating unit represented by the general formula (3) may be copolymerized with a repeating unit represented by the general formula (4).

In the aromatic polyester which has a repeating unit selected from the formulae (1) to (5), the ratio between the repeating unit having a 2,7-naphthylene group (l unit) and the repeating unit having a bisphenol group (m unit) [l/(l+m)] is not particularly limited. The ratio [l/(l+m)] is preferably 0.1 or more, more preferably from 0.1 to 0.9, and particularly preferably from 0.2 to 0.8. The aromatic polyester having such a ratio makes it possible to form a birefringent film which is in particular good in solubility in a solvent and is large in Δnxz.

The aromatic polyester of the present invention may have a repeating unit different from the repeating units represented by the formulae (1) to (5). Examples of the different repeating unit include a repeating unit having an imide skeleton, a repeating unit having a fluorene skeleton, a repeating unit having a styrene skeleton, and the like.

When the aromatic polyester of the present invention has at least one repeating unit selected from the formulae (1) to (5) and a repeating unit different therefrom, the amount of the repeating unit selected from the formulae (1) to (5) is preferably 50% or more by mole of the whole of the polymer, and more preferably 70% or more by mole thereof. If the amount of the repeating unit selected from the formulae (1) to (5) is too small, it is feared that the advantageous effects of the present invention are not sufficiently exhibited.

In the aromatic polyester, the arrangement of the repeating units is not particularly limited. Thus, either block copolymerization or random copolymerization is allowable.

The weight-average molecular weight (Mw) of the aromatic polyester of the present invention is not particularly limited, and is preferably from 10000 to 500000.

The glass transition temperature (Tg) of the aromatic polyester of the present invention is not particularly limited, and is preferably from 100 to 300° C. The aromatic polyester having a glass transition temperature of 100 to 300° C. is good in heat resistance. The aromatic polyester can be caused to undergo drawing treatment or the like satisfactorily when this polyester is formed into a film.

The weight-average molecular weight and the glass transition temperature are values measured in accordance with measuring methods described in examples which will be described later.

The aromatic polyester can be yielded, for example, by polycondensing a bisphenol compound, a 2,7-dihydroxynaphthalene compound, and a dicarboxylic acid compound with each other.

The method for the polycondensation is not particularly limited. The polycondensation method is, for example, an interfacial polymerization method wherein a bisphenol compound, a 2,7-dihydroxynaphthalene compound and a dicarboxylic acid compound are caused to undergo condensation reaction in the presence of a phase transfer catalyst. This interfacial polymerization method is, for example, a method of causing the compounds to react with each other in an interface of a two-phase system of an aqueous alkali solution and a non-water-soluble organic solvent (W/O dispersion system). This interfacial polymerization method makes it possible to yield an aromatic polyester good in transparency and high in molecular weight.

Examples of the bisphenol compound include 2,2-bis(3,5-dimethyl-4-hydroxyphenyl)-4-methylpentane, 2,2-bis(3-methyl-4-hydroxyphenyl)propane, 2,2-bis(3,5-dimethyl-4-hydroxyphenyl)propane, 2,2-bis(3-methyl-4-hydroxyphenyl)butane, and the like.

The dicarboxylic acid compound is preferably 4,4'-stilbenedicarboxylic acid chloride. In order to yield an aromatic polyester good in solubility in a solvent, it is allowable to use, as the dicarboxylic acid compound, terephthalic acid chloride, isophthalic acid chloride, phthalic acid chloride, biphenyldicarboxylic acid chloride, and the like.

Examples of the phase transfer catalyst include quaternary ammonium salts such as benzyltriethylammonium chloride, and quaternary phosphonium salts such as tetraphenylphosphonium chloride.

Examples of the non-water-soluble organic solvent include chloroform and dichloromethane.

The aromatic polyester has a repeating unit having a 2,7-naphthylene group. About the aromatic polyester, therefore, in the repeating unit thereof, the main chain is bent to an appropriate degree. Thus, the aromatic polyester is easily dissolved in various solvents.

Furthermore, the aromatic polyester has a bisphenol group having a substituent (substituent represented by R2). This substituent, R2, becomes a steric hindrance between the two benzene rings of the bisphenol group. By the existence of R2, the two benzene rings of the bisphenol group are twisted. The matter that the two benzene rings are twisted means that the benzene rings are rotated around the center made of bonding hands from the para-positions of the two benzene rings. The aromatic polyester, wherein the two benzene rings are twisted in such a manner, is easily dissolved in various solvents.

Accordingly, the aromatic polyester having at least one repeating unit selected from the formulae (1) to (5) is good in solubility in various solvents.

In the meantime, the 2,7-naphthylene groups in the aromatic polyester are rich in π electrons. About the aromatic polyester, therefore, interaction between the aromatic rings of its main chain is intense.

In each of the bisphenol groups of the aromatic polyester, the two benzene rings are bonded to each other at the para-positions thereof. Therefore, the main chain of the aromatic polyester in the bisphenol group keeps linearity.

This aromatic polyester is suitable as a material for forming a birefringent film large in $\Delta nxz$.

(Birefringent Film of the Present Invention)

The birefringent film of the present invention is a film containing an aromatic polyester having a repeating unit of at least one selected from the formulae (1) to (5).

The birefringent film of the present invention may contain, for example, an aromatic polyester having a repeating unit represented by the general formula (3) and an aromatic polyester having a repeating unit represented by the general formula (4). Alternatively, the birefringent film of the present invention may contain, for example, an aromatic polyester wherein a repeating unit of the general formula (3) is copolymerized with a repeating unit of the general formula (4).

The amount of the aromatic polyester contained in the birefringent film of the present invention is not particularly limited, and may be appropriately set. The aromatic polyester is contained in the birefringent film of the present invention preferably in an amount of 50 to 100% by mass and more preferably 80 to 100% by mass of the total mass of the film.

As far as the birefringent film of the present invention contains the aromatic polyester, the film may further contain a different polymer.

Examples of the different polymer include polyimide, polyether ketone, polyamide imide, polystyrene, polyethylene, polypropylene, polyacetal, polycarbonate, polyamide, polyethylene terephthalate, polybutylene terephthalate, polyphenylene sulfide, polyether sulfone, and the like.

When the different polymer is blended, the amount thereof to be blended is less than 50% by mass of the total mass of the birefringent film.

The birefringent film of the present invention may contain an additive as necessary. Examples of the additive include an UV absorber, an antistat, an antioxidant, a heat stabilizer, a light stabilizer, a lubricant, a flame retardant, and the like.

About the birefringent film of the present invention, the nz (the refractive index in the thickness direction of the film) is smaller than the nx (the maximum in-plane refractive index of the film). In short, the birefringent film of the present invention satisfies the relationship of nx>nz. In the birefringent film of the present invention, the index ellipsoid thereof also satisfies any one of nx>ny>nz, nx>nz>ny, and nx>ny=nz.

The birefringent film of the present invention contains the above-mentioned aromatic polyester. As described above, about the aromatic polyester, its 2,7-naphthylene groups make the interaction between its aromatic rings strong. In addition thereto, its bisphenol groups, in each of which two benzene rings are bonded to each other at the para-positions, keep the linearity of its main chain. The birefringent film of the present invention, which contains the aromatic polyester, has a relatively large $\Delta nxz$. Specifically, the birefringence index ($\Delta nxz$) of the birefringent film in the thickness direction at a wavelength of 550 nm is preferably 0.02 or more and more preferably from 0.02 to 0.08.

Even when the birefringent film of the present invention is made to have a relatively small thickness, the film has a relatively large Rth ($\lambda$). This is because the retardation value (Rth ($\lambda$)) in the thickness direction is obtained as the product of the birefringence index in the thickness direction and the thickness.

The thickness of the birefringent film of the present invention is not particularly limited, and may be appropriately set by adjusting application thereof, Rth ($\lambda$), and the like. The thickness of the birefringent film of the present invention is preferably 20 µm or less, more preferably from 1 µm to 20 µm, and particularly preferably from 1 µm to 10 µm.

The birefringent film of the present invention may be formed by a solution casting method, for example, so that the thin film as described above can be formed.

The birefringent film of the present invention has high transparency since the birefringent film contains the above aromatic polyester. The transmittance (T(400)) of the birefringent film at a wavelength of 400 nm is preferably 90% or more and more preferably 92% or more. In the aromatic polyester of the present invention, the two benzene rings in each of its bisphenol groups are twisted, as described above; thus, the benzene rings, which are adjacent to each other, are restrained from overlapping with each other. Accordingly, the birefringent film containing the aromatic polyester has high transparency.

Furthermore, the birefringent film of the present invention is good in heat resistance and mechanical strength since the film contains the aromatic polyester as the main component.

The birefringent film of the present invention can be formed by a solution casting method, a melt extrusion method, or any other arbitrary method. The birefringent film of the present invention may be drawn.

The aromatic polyester of the present invention can easily be dissolved in a widely-used organic solvent such as toluene. Accordingly, the birefringent film of the present invention can be formed by a solution casting method using a widely-used organic solvent.

The following will specifically describe a case where the birefringent film of the present invention is formed by a solution casting method.

The solution casting method is a method of dissolving the aromatic polyester in a solvent to prepare a solution, coating this solution onto a substrate to form a coating film, and then drying this coating film, thereby forming a film.

The aromatic polyester of the present invention (to which some other polymer and various additives are added as necessary) is dissolved in an appropriate solvent.

The aromatic polyester of the present invention can be dissolved in various solvents. The solvents may be organic solvents, and are particularly preferably widely-used organic solvents.

The organic solvent is not particularly limited and appropriately selected as far as it can dissolve the aromatic polyester of the present invention and the like. Examples of the aromatic solvent include aromatic hydrocarbons such as benzene, toluene, and xylene; ketones such as cyclopentane, methyl ethyl ketone, and methyl isobutyl ketone; esters such as acetic ether, and butyl acetate; and the like. These solvents may be used singly or in combination of two or more kinds.

The concentration of solids in the solution is usually from 1 to 40% by mass. The solution having a concentration in this range is preferable since the solution comes to have a viscosity appropriate for being coated.

The prepared solution is coated on an arbitrary substrate.

The substrate is not particularly limited, but may be a polymer substrate or a substrate made of an inorganic compound such as a glass substrate and a silicon wafer. Examples of the polymer substrate include a film produced by the cast method, a film produced in such a manner that a molten polymer is formed into a film and thereafter subjected to drawing treatment, and the like. Among these, a film which is subjected to drawing treatment is preferable, for the reason that the prepared solution can be coated accurately.

Furthermore, a substrate excellent in transparency is preferably used. The use of the substrate excellent in transparency allows a birefringent film formed on the substrate to be used directly without being peeled off the substrate.

Examples of the polymer component of the polymer substrate include celluloses such as triacetyl cellulose (TAC), a polyester, a polyethersulfone, a polysulfone, a polycarbonate, a polyamide, a polyimide, a polyolefin, an acrylic resin, a polynorbornene, a polyarylate, a polystyrene, a polyvinyl alcohol, a polyvinyl chloride, a liquid crystal polymer, and a mixture thereof. The solution containing the aromatic polyester of the present invention can be satisfactorily coated also onto a polymer substrate made mainly of an acrylic resin or polyolefin. The use of the substrate makes it possible to produce a birefringent film at lower costs. Conventional aromatic polyesters are dissolved only in solvents very high in polarity. Thus, conventional polyester solutions cannot be satisfactorily coated onto a polymer substrate made mainly of an acrylic resin or the like. On the other hand, the aromatic polyester of the present invention can be dissolved in a solvent low in polarity (such as toluene). Thus, the solution of the aromatic polyester of the present invention can be satisfactorily coated onto a polymer substrate made mainly of an acrylic resin or the like.

The thickness of the substrate is, for example, from 12 μm to 200 μm, preferably from 20 μm to 150 μm, and more preferably from 25 μm to 100 μm. When the thickness of the substrate is 12 μm or more, the solution can be coated accurately. On the other hand, when the thickness of the substrate is 200 μm or less, deformation of the birefringent film can be further restricted.

The method for coating the solution on the substrate is not particularly limited. As the coating method, an arbitrary coater such as a spin coater, a die coater, a bar coater, and the like may be used.

After the solution is coated onto the substrate to form a coating film, the coating film is dried. The drying treatment may be conducted by, for example, natural drying, drying by wind, drying by heating, or the like. When the drying by heating is adopted, the heating temperature is not particularly limited, but for example, from 25° C. to 250° C. and preferably from 40° C. to 200° C.

The dried coating film is the birefringent film of the present invention.

The amount of the solvent remaining in the birefringent film is preferably 1% by mass or less and more preferably 0.5% by mass or less. The birefringent film wherein the amount of the remaining solvent is small is good in dimensional stability so that the film does not easily undergo a change in optical properties with the passage of time.

The resultant birefringent film is thin, and further exhibits an optically uniaxial property (nx>nz).

The aromatic polyester of the present invention has a nature that in a step in which the solvent volatilizes, the polyester is spontaneously aligned so as to make the nz smaller than the nx. For this reason, a birefringent film satisfying the relationship of nx>nz can easily be produced by a solution casting method using the aromatic polyester.

The aromatic polyester of the present invention can easily be dissolved in a widely-used organic solvent such as toluene. When the birefringent film is formed by a solution casting method, the use of a widely-used organic solvent does not easily cause conditions for drying the solution to be restricted. Therefore, the birefringent film can be formed by use of existing versatile production facilities.

As necessary, a birefringent film exhibiting an optically biaxial property can also be formed by drawing or shrinking the above-mentioned birefringent film, which satisfies the relationship of nx>nz.

The Rth (λ) of the birefringent film of the present invention may be appropriately adjusted. The adjustment may be attained by, for example, the selection of the structure and the molecular weight of the used polymer, the setting of the thickness of the birefringent film, the setting of the draw ratio when the film is formed, and so on.

Rth (λ) of the birefringent film of the present invention is, for example, 10 nm or more, preferably 10 nm to 500 nm, and more preferably 25 nm to 250 nm.

The birefringent film of the present invention may be used in an appropriate and arbitrary application. Examples of the representative application of the birefringent film of the present invention include a λ/4 plate, a λ/2 plate, a view angle widening film, and the like. Examples of another application of the birefringent film of the present invention include an antireflection film for image display and the like. Examples of the image display include a liquid crystal display, an organic EL display, a plasma display, and the like.

Figure 1:
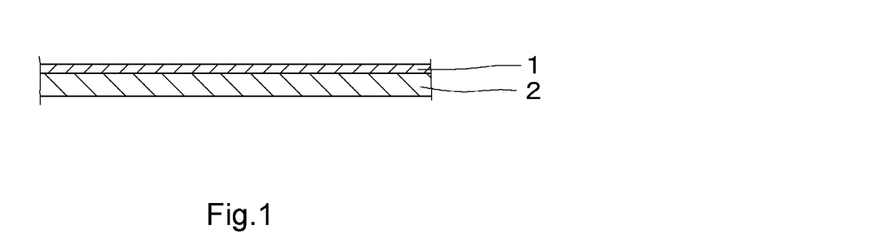
FIG. 1 is a sectional view of a birefringent film according to an embodiment of the present invention.

A birefringent film 1 according to an embodiment of the present invention is laminated on a substrate 2 (see FIG. 1).

A birefringent film according to another embodiment of the present invention is used in the state that the film is peeled from its substrate.

The birefringent film of the present invention may be laminated other optical film as necessary. Examples of the other optical film include a retardation film, a polarizer, a protective film, and the like.

A polarizing plate can be constructed by laminating the birefringent film of the present invention on the polarizer.

The polarizing plate of the present invention has the birefringent film of the present invention and the polarizer, and may have the protective film as necessary.

Figure 2:
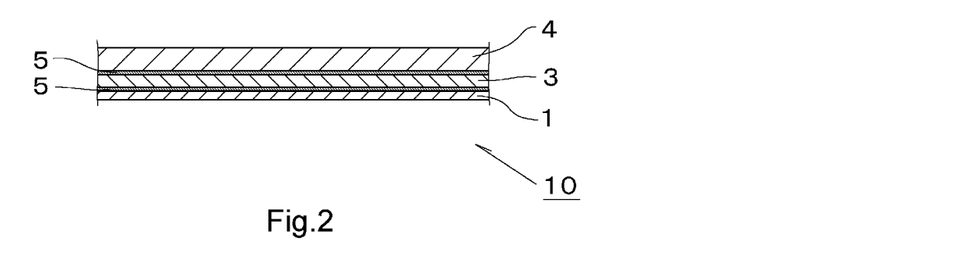
FIG. 2 is a sectional view of a polarizing plate according to an embodiment of the present invention.

In a polarizing plate 10 according to an embodiment of the present invention, a polarizer 3 is attached to one of the surfaces of the birefringent film 1, and a protective film 4 is attached to one of the surfaces of the polarizer 3 (see FIG. 2). Reference numbers 5 each represent an adhesive layer for causing two of the individual layers to adhere onto each other. In this polarizing plate 10, the birefringent film 1 protects the other surface of the polarizer 3. In other words, the birefringent film 1 functions also as a protective film. Thus, it is sufficient for the protective film 4 to be caused to adhere only onto one of the surfaces of the polarizer 3. Thus, the polarizing plate 10 can be provided as a thin plate.

Figure 3:
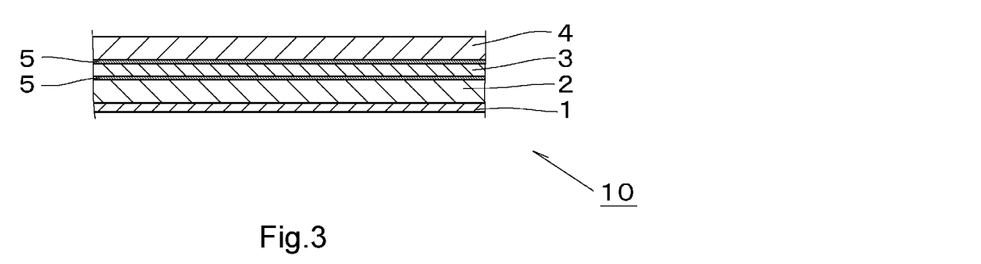
FIG. 3 is a sectional view of a polarizing plate according to another embodiment of the present invention.

In a polarizing plate 10 according to another embodiment of the present invention, a birefringent film 1 is laminated onto a substrate 2, a polarizer 3 is attached to one of the surfaces of the substrate 2, and a protective film 4 is attached to one of the surfaces of the polarizer 3 (see FIG. 3). Reference numbers 5 each represent an adhesive layer for causing two of the individual layers to adhere onto each other. In this polarizing plate 10, the substrate 2, which is laminated on the birefringent film 1, protects the other surface of the polarizer 3. In other words, the substrate 2 functions also as a protective film. Thus, when the polarizer 3 is attached, the birefringent film 1 does not have to be peeled from the substrate 2, so that the process for producing the polarizing plate 10 can be made simple.

The above-mentioned polarizer is an optical film which can convert a natural light or a polarized light into a linear polarized light. The polarizer is not particularly limited and appropriate optical film may be used properly. The polarizer is preferably a drawn film containing a vinyl alcohol-based polymer including iodine or a dichroic dye as a main component. The thickness of the polarizer is usually 10 μm to 200 μm. Also, a protective film may be laminated on both surfaces of the polarizer. The protective film is an optical film used for preventing constriction or expansion of the polarizer and/or preventing degradation of the polarizer by the ultraviolet rays. The protective film is preferably a film excellent in transparency. Examples of the protective film include a polymer film containing an acrylic-based polymer, an olefin-based polymer, a cellulose-based polymer, a norbornene-based polymer, and the like. The thickness of the protective film is usually 10 µm to 200 µm.

An arbitrary adhesive (or pressure-sensitive adhesive) is used as the adhesive layer. Examples of the adhesive include a solvent adhesive, an emulsion adhesive, a pressure-sensitive adhesive, a rewet adhesive, a polycondensation adhesive, a solventless adhesive, a film form adhesive, a hot-melt adhesive, and the like.

The above-mentioned birefringent film or the polarizing plate is used in, for example, an image display.

As the structure of the image display of the present invention, the same structure as any conventional image display has may be adopted except that the birefringent film of the present invention is integrated into the structure.

The image display of the present invention is used in arbitrary and appropriate applications. When the image display is a liquid crystal display, examples of the application thereof include office automation equipments such as a personal computer monitor, a notebook computer, and a copying machine; portable equipments such as a portable telephone, a watch, a digital camera, a personal digital assistant (PDA), and a portable game machine; domestic electrical equipments such as a video camera and a microwave oven; on-vehicle equipments such as a back monitor, a monitor for a car navigation system, and a car audio; display equipments such as an information monitor for a commercial store; security equipments such as an observation monitor; and care/medical equipments such as a care monitor and a medical monitor.

The aromatic polyester of the present invention is excellent in transparency and heat resistance. Furthermore, the aromatic polyester of the present invention is excellent in solubility in various organic solvents. The organic polyester is preferably used as a forming material for various optical films which include a birefringent film.

As applications of the aromatic polyester of the present invention, the aromatic polymer of the present invention may be used as a forming material of a plastic lens, a prism, an optical disc, an optical fiber, a photoresist, and a hologram, except for an optical film.

Also, the aromatic polymer of the present invention may be used as a coating agent for protecting a surface of a member, for the reason that the aromatic polymer is excellent in solvent solubility.

EXAMPLES

Next, the present invention is described in detail with reference to following Example and Comparative Examples. However, the present invention is not limited to the following Example.

Here, each analytical method used in Example and Comparative Examples is as follows.
<Measurement of Glass Transition Temperature>

A differential scanning calorimeter (product name: "DSC-6200", manufactured by Seiko Instruments, Inc.) was used to measure the glass transition temperature in accordance with JIS K 7121 (1987) (Method for Measuring the Transition Temperature of Plastics). Specifically, the temperature of a sample for powder-measurement, 3 mg in weight, was raised from 23 to 220° C. at a temperature-raising rate of 10° C./minute under the atmosphere of nitrogen (gas flow: 50 mL/minute), and then the temperature was lowered to 30° C. at a temperature-lowering rate of 10° C./minute (this was a first measurement). Thereafter, the temperature was again raised to 350° C. at a temperature-raising rate of 10° C./minute (this was a second measurement). The data obtained in the second measurement was adopted as the glass transition temperature. About the calorimeter, temperature-correction was made using a standard material (indium).
<Measurement of Weight-Average Molecular Weight>

Each measurement samples was prepared to 0.1%-tetrahydrofuran solution and filtered through a 0.45-µm membrane filter to thereafter measure weight-average molecular weight by using a gel permeation chromatography device (product name: "HLC-8820GPC", manufactured by Tosoh Corporation) incorporated a detector (RI) into itself. Specifically, as the measurement condition, the column temperature was 40° C. and the pump flow rate was 0.35 mL/minute. The molecular weight of the measurement sample was obtained from the molecular weight converted into polystyrene by using the calibration curve of standard polystyrene with the molecular weight thereof known previously. The used column was such that Super HZM-M (diameter 6.0 mm×length 15 cm), Super HZM-M (diameter 6.0 mm×length 15 cm), and Super HZ2000 (diameter 6.0 mm×length 15 cm) were connected in series. The used mobile phase was tetrahydrofuran.
<Measurement of Transmittance (T (400))>

Transmittance (T (400)) was measured by using a spectrophotometer (product name: "U-4100", manufactured by Hitachi, Ltd.) at a wavelength of 400 nm.
<Measurement of Birefringence Index in Thickness Direction>

A retardation measuring device (product name: "KOBRA-WPR", manufactured by Oji Scientific Instruments) was used to measure the birefringence index ($\Delta nxz$ (550)) in the thickness direction at 23° C. and a measuring wavelength of 550 nm. The birefringence index in the thickness direction was calculated from the in-plane retardation value and the retardation value (R40) when the film was inclined at 40 degrees through a program attached to the retardation measuring device.
<Measurement of Thickness>

The thickness of the film was measured by using a touch probe type surface shape measuring tool (product name: "Dektak", manufactured by Sloan).

Example

In a reactor equipped with a stirrer, 2.45 g of 2,2-bis(3,5-dimethyl-4-hydroxyphenyl)-4-methylpentane, 0.40 g of 2,7-dihydroxynaphthalene, and 0.12 g of trimethyl n-octylammonium chloride were dissolved into 30 mL of a 1 M solution of potassium hydroxide in water. At a stretch, to this solution was added a solution wherein 1.02 g of terephthalic acid chloride and 1.02 g of isophthalic acid chloride were dissolved in 30 mL of chloroform while the former solution was stirred. The resultant solution was then stirred at room temperature (23° C.) for 90 minutes. Thereafter, this solution was allowed to stand still to separate a polymer-containing chloroform solution. Next, this chloroform solution was washed with an aqueous solution of acetic acid, and further washed with ion exchange water. Then the solution was poured into methanol to precipitate a polymer. The precipitated polymer was filtrated and dried under reduced pressure to yield an aromatic polyester of the following structural formula (6).

[chemical formula 8]

(6)

The glass transition temperature (Tg) of the resultant aromatic polyester was 205° C., and the weight-average molecular weight (Mw) thereof was 63,000.

This aromatic polyester was dissolved in each solvent shown in Table 1. In the method for the dissolution, the polymer was added bit by bit to a bottle in which each of the solvents (cyclopentanone, ethyl acetate, and toluene) was put, and the degree of the dissolution was judged with the naked eye.

As a result, the aromatic polyester was dissolved in an amount of 25 parts by mass or more in 100 parts by mass of each of the solvents.

Next, 150 mg of the resultant aromatic polyester was dissolved in 850 mg of toluene to prepare a solution. This solution was coated onto a glass substrate by a spin coating method. The resultant was dried at 70° C. for 5 minutes, and further dried at 110° C. for 30 minutes. In this manner, a birefringent film according to Example was formed on the substrate.

The thickness of the birefringent film of Example was 5.0 μm. The transmittance (T(400)) of the birefringent film was 92%, and the birefringence index (Δnxz(550)) in the thickness direction was 0.025.

TABLE 1

| | Polymer structural formula | Solubility in solvent | | | Birefringence index in thickness direction |
|---|---|---|---|---|---|
| | | Cyclopentanone | Ethyl acetate | Toluene | |
| Example | (6) | Soluble | Soluble | Soluble | 0.025 |
| Comparative Example 1 | (10) | Soluble | Soluble | Soluble | 0.014 |
| Comparative Example 2 | (11) | Insoluble | Insoluble | Insoluble | 0.020 |

Comparative Example 1

In a reactor equipped with a stirrer, 1.50 g of 2,2-bis(3,5-dimethyl-4-hydroxyphenyl)-4-methylpentane and 0.06 g of benzyltriethylammonium chloride were dissolved into 30 mL of a 1 M solution of potassium hydroxide in water. At a stretch, to this solution was added a solution wherein 0.47 g of terephthalic acid chloride and 0.47 g of isophthalic acid chloride were dissolved in 15 mL of chloroform while the former solution was stirred. The resultant solution was then stirred at room temperature (23° C.) for 90 minutes. Thereafter, this solution was allowed to stand still to separate a polymer-containing chloroform solution. Next, this chloroform solution was washed with an aqueous solution of acetic acid, and further washed with ion exchange water. Then the solution was poured into methanol to precipitate a polymer. The precipitated polymer was filtrated and dried under reduced pressure to yield a polymer of the following structural formula (10).

[chemical formula 9]

(10)

The glass transition temperature (Tg) of the polymer was 205° C., and the weight-average molecular weight (Mw) thereof was 77,000.

In the same way as the Example, the polymer was dissolved in each solvent shown in Table 1. As a result, the polymer was dissolved in an amount of 25 parts by mass or more in 100 parts by mass of each of the solvents.

Next, 200 mg of the resultant polymer was dissolved in 800 mg of toluene to prepare a solution. In the same way as the Example, a birefringent film according to the Comparative Example 1 was formed.

The thickness of the birefringent film of the Comparative Example 1 was 5.0 μm. The transmittance (T(400)) of the birefringent film was 92%, and the birefringence index (Δnxz (550)) in the thickness direction was 0.014.

Comparative Example 2

In a reactor equipped with a stirrer, 2.28 g of 2,2-bis(4-hydroxyphenyl)propane and 0.07 g of benzyltriethylammonium chloride were dissolved into 30 mL of a 1 M solution of potassium hydroxide in water. At a stretch, to this solution was added a solution wherein 1.02 g of terephthalic acid chloride and 1.02 g of isophthalic acid chloride were dissolved in 30 mL of chloroform while the former solution was stirred. The resultant solution was then stirred at room temperature (23° C.) for 90 minutes. Thereafter, this solution was allowed to stand still to separate a polymer-containing chloroform solution. Next, this chloroform solution was washed with an aqueous solution of acetic acid, and further washed with ion exchange water. Then the solution was poured into methanol to precipitate a polymer. The precipitated polymer was filtrated and dried under reduced pressure to yield a polymer of the following structural formula (11).

[chemical formula 10]

(11)

The glass transition temperature (Tg) of the polymer was 200° C., and the weight-average molecular weight (Mw) thereof was 77,000.

In the same way as in the Example, this polymer was dissolved in each of the solvents shown in Table 1. As a result, the polymer was substantially not dissolved in any one of the solvents.

Next, 150 mg of the resultant polymer was dissolved in 850 mg of chloroform to prepare a solution. This solution was coated onto a glass substrate by a spin coating method. The resultant was dried at room temperature (23° C.) for 5 minutes, and further dried at 80° C. for 30 minutes. In this manner, a birefringent film according to the Comparative Example 2 was formed on the substrate.

The thickness of the birefringent film of the Comparative Example 2 was 5.0 μm. The transmittance (T(400)) of the birefringent film was 92%, and the birefringence index (Δnxz (550)) in the thickness direction was 0.020.

[Evaluation]

The aromatic polyester of the Example is good in solubility in each of the solvents. The birefringent film of the Example containing the aromatic polyester is large in birefringence index in the thickness direction.

On the other hand, the polymer of the Comparative Example 1 is good in solubility in a solvent. However, the birefringent film of the Comparative Example 1 containing the polymer is far smaller in birefringence index in the thickness direction than the birefringent film of the Example.

The polymer of the Comparative Example 2 is substantially not dissolved in each of the widely-used solvents as shown in Table 1. About the polymer of the Comparative Example 2, therefore, the kind of a solvent therefor is limited. The birefringent film of the Comparative Example 2 containing the polymer is smaller in birefringence index in the thickness direction than the birefringent film of the Example.

What is claimed is:

1. A birefringent film, comprising an aromatic polyester having a repeating unit represented by the following general formula (1):

[chemical formula 1]

(1)

-continued wherein A(s), B(s), C(s), and D(s) are each a substituent, and each independently represent a group selected from a halogeno group, a linear or branched alkyl group which has 1 to 6 carbon atoms and may have a substituent, and an aryl group which may have a substituent; a, b, c, and d are each the substitution number of the corresponding A(s), B(s), C(s), or D(s); a and b each represent an integer of 0 to 4; c and d each represent an integer of 0 to 3; R1 represents a hydrogen atom, or a linear or branched alkyl group which has 1 to 10 carbon atoms and may have a substituent; R2 represents a linear or branched alkyl group which has 2 to 10 carbon atoms and may have a substituent; R3 to R6 each independently represent a group or atom selected from a hydrogen atom, a halogeno group, a linear or branched alkyl group which has 1 to 6 carbon atoms and may have a substituent, and an aryl group which may have a substituent; and l and m each represent an integer of 2 or more.

2. The birefringent film according to claim 1, wherein R2 in the general formula (1) is an alkyl group which has more carbon atoms than R1 has.

3. The birefringent film according to claim 1, wherein R1 in the general formula (1) is a methyl group which may have a substituent, and R2 is a linear or branched alkyl group which has 2 to 4 carbon atoms and may have a substituent.

4. The birefringent film according to claim 1, wherein R3 to R6 in the general formula (1) are each a linear or branched alkyl group which has 1 to 4 carbon atoms and may have a substituent.

5. The birefringent film according to claim 1, wherein the aromatic polyester is an aromatic polyester having a repeating unit represented by the following general formula (2):

[chemical formula 2]

(2)

wherein R1 to R6, l, and m have the same meanings as in the general formula (1).

6. The birefringent film according to claim 1, wherein a birefringence index (Δnxz) in the thickness direction thereof is 0.02 or more at a wavelength of 550 nm.

7. A polarizing plate, having the birefringent film as recited in claim 1, and a polarizer.

8. An image display, having the birefringent film as recited in claim 1.

\* \* \* \* \*